Nov. 25, 1969  A. RUTENBERG  3,479,820
ECONOMICAL UTILIZATION OF EXISTING POWER PLANTS
Filed Oct. 30, 1967  2 Sheets—Sheet 1

INVENTOR
ABRAHAM RUTENBERG
BY Bacon & Thomas
ATTORNEYS

Nov. 25, 1969  A. RUTENBERG  3,479,820
ECONOMICAL UTILIZATION OF EXISTING POWER PLANTS
Filed Oct. 30, 1967  2 Sheets-Sheet 2

INVENTOR
ABRAHAM RUTENBERG

BY Bacon & Thomas
ATTORNEYS

United States Patent Office 3,479,820
Patented Nov. 25, 1969

3,479,820
ECONOMICAL UTILIZATION OF EXISTING
POWER PLANTS
Abraham Rutenberg, 13 Panorama Road,
Haifa, Israel
Filed Oct. 30, 1967, Ser. No. 679,024
Claims priority, application Great Britain, Nov. 8, 1966,
50,078/66
Int. Cl. F01b 31/16; F02b 41/10; F01k 19/10
U.S. Cl. 60—64                                              4 Claims

ABSTRACT OF THE DISCLOSURE

A steam power plant utilizes a condensing steam turbine to generate electricity until a substantial part of the capital cost of the plant is recovered. Then the condensing steam turbine is replaced by a back pressure turbine and the quantity of steam input is increased to permit electrical output susbtantially equal to the original output and low pressure exhaust steam is then used for other purposes, for example, to operate a water desalination plant.

---

This invention concerns improvements in or relating to the economical utilization of existing and future power plants.

The continuous and rapid development of steam driven electric power plant, both as to growth of size of generating units and as to increase in their thermal efficiency, results after a number of years, in the existing generating plant becoming uneconomical as compared with new plant and being consequently used not for continuous base load operation as in the initial period of its life but only intermittently—in times of peak-load and as standby plant.

Figure 1:
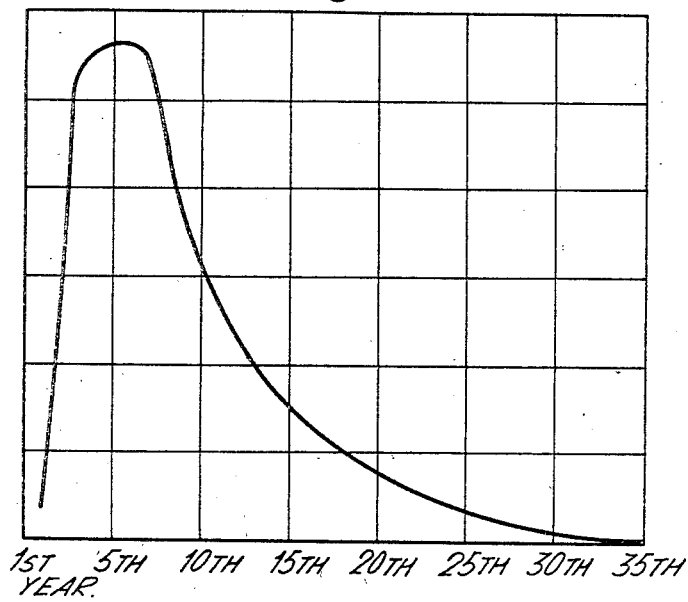
FIG. 1 is a graph illustrating the change in output of generating plant in terms of time.

It is well known that in a growing power supply system the annual electricity output in kwh. of a generating plant after an initial period of its working at full capacity goes down exponentially in the course of years approximately as per FIGURE 1 of the accompanying drawings.

The object of the present invention is to improve radically the economic utilization of such electricity generating plants at the time they become uneconomical and obsolescent. The method proposed consists in changing over then from single purpose to dual purpose utilisation, as explained below, in such a way that the generating plant can be used again most economically for base load and that the electricity output and the second purpose output are both at optimum value.

Such a change over to dual purpose operation in accordance with the invention consists in conversion of an existing power plant, which during a number of years was operated for generation of electric power only, to operate for two purposes, namely—

(a) To generate the same amount of electric power as hitherto and (b) To provide a substantial source of heat for industrial or other purposes and more especially in connection with desalination of sea water.

It should be noted, that a great number of single-purpose power plants in the world, which universally use condensing steam turbines, are sited whenever possible near the sea in order to take advantage of the unlimited supply of cooling water for the steam condensers.

In countries where a shortage of fresh water has to be avoided through desalination of sea water the present invention by the use of existing older power plant situated near the sea makes it possible:

(a) To provide from such existing plants electric power at the same cost per kwh. as from a new and most modern power plant of a size suitable to be installed there, and (b) To produce fresh water by a desalination plant combined with such existing power plant, the cost of the latter being to a great extent already written-off, at a considerably lower cost per unit of water than by a combined plant for power and water, specially and newly built, whether using nuclear or fossil fuel.

An important component of the cost of both the electrical power and associated product, for example, purified water, in such a combined installation are the annual fixed charges based on the capital cost of the plant spread over a period of years and the present invention provides a method of reducing such capital costs and thereby reducing the overall cost of purified water and electricity.

Instead of erecting new power generating plant to supply also heat for an adjacent production plant, e.g. for desalination of sea water, the capital cost can be greatly reduced by using according to this proposal an existing power generating plant at a stage in its life at which a substantial proportion of its capital cost has been recovered and since virtually all power generating plants designed solely for power generation use condensing-steam turbines (which are not suitable economically for supplying large quantities of low pressure steam) certain modifications of the existing power generating plant are required in accordance with this invention.

In order to adapt an existing power generating plant of the type used solely for power generation and comprising a steam generator, a condensing-steam turbine, an electricity generator, and associated electrical and mechanical equipment, it is necessary to replace the existing turbine by a passout or preferably by a back-pressure turbine, that is a turbine of a type which does not condense the working steam and can thus supply large quantities of low pressure steam e.g. at about 30–45/p.s.i.a. According to this invention the original electricity generator may be retained, and in order that the power output of the new turbine should be substantially the same as that of the original turbine, the input of high pressure steam to the new turbine should be higher by the order of 50% with a suitable margin. The cost of the new turbines, additional steam generating plant and some auxiliary equipment will be only a fraction of the total capital cost of a new power station of the same capacity and since the capital cost of the remaining plant will have largely been recovered already, the total capital outlay for production of power and heat will be considerably less than if a new plant of the same capability were to be built.

Figure 2:
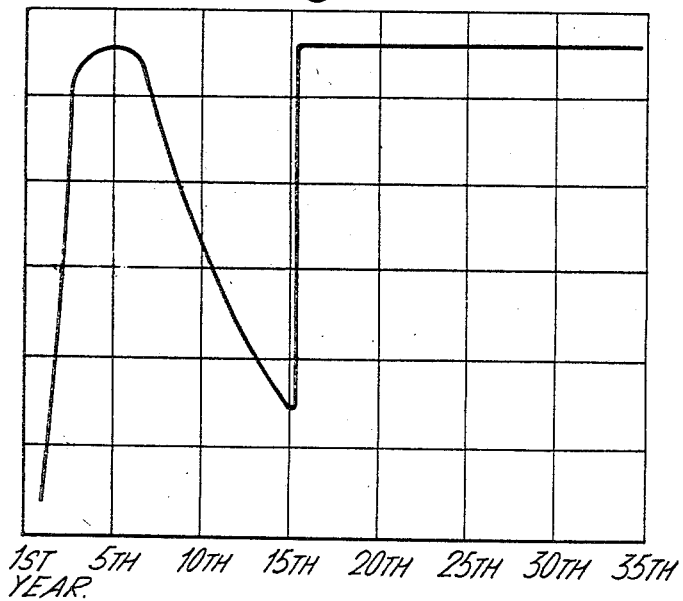
FIG. 2 is a graph, similar to FIG. 1 but showing the output of a plant operating according to the present invention.

It is claimed, that according to the present invention of dual purpose utilisation as mentioned above and as applied to an existing power plant, say after 15 years of its single purpose work, its annual production in kwh. may advantageously revert to full capacity according to FIGURE 2 of the accompanying drawings.

According to the present invention there is provided a method of generating electrical power whereby a power generating plant is used to supply both electricity and low-pressure steam, which latter provides process heat for an adjacent steam-utilising production plant, at a stage in its life at which a substantial proportion of its capital costs have been recovered, one or more of the condensing-steam turbines of said generating plant having been replaced by one or more pass-out or back-pressure steam turbines, the input of high pressure steam to which being increased in such a way that substantially equivalent power output is obtained and substantial amounts of low pressure steam are provided.

It should be noted that the overall thermal efficiency of such a plant according to the invention will be very high and it would thus be economical for use in base load supply and could supply electrical power substantially as cheaply as the most modern power plant while enabling an associated desalination plant to produce fresh water at a considerably lower cost than if a completely new combined plant were erected.

The invention is thus particularly applicable to the combined production of electrical power and desalinated water and the adjacent plant to which low pressure steam is passed is thus advantageously a desalination plant.

The desalination plant may, for example, be of the multi-stage flash distillation type. In this system, the incoming sea water which serves as coolant for condensation of the vapour in the successive flashing stages, is thus gradually heated up and is then boosted in the brine heater to a higher temperature e.g. of 110° C. or higher before passing to the first and hottest flashing stage.

According to a still further feature of the invention there is provided a method of combining power generating and steam-utilizing production plant whereby a production plant utilizing steam as heat supply is constructed adjacent to an existing power generating plant such power plant being at a stage in its life at which a substantial proportion of its capital costs have been recovered and one or more of the condensing-steam turbines of the power generating plant are replaced by one or more pass-out or back-pressure steam turbines of substantially equivalent electrical power output and is adapted to supply low pressure steam as heat source for said production plant, whereby the new capital outlay for said combined installation is substantially lower than that of constructing a combined installation of equivalent output utilizing a newly constructed power generating plant.

The same basic idea may be applied with considerable advantage when designing a new electric power generating plant, which in the first period of its life should serve as a single purpose plant for generating electricity only and at a later stage after a number of years be converted into a dual purpose plant; for generating electricity and for supplying heat, say, to a water desalting plant.

The steam turbogenerator may from the outset be split into two, consisting of a turbogenerator A having a steam turbine, in which the steam is expanded from high pressure to a low pressure (suitable later for utilization at a future adjacent desalination plant) and a second turbogenerator B of a condensing type, in which the low pressure steam exhausted from turbine A is further expanded to the highest practically possible vacuum. This arrangement should operate as long as the plant is used for generation of electricity only.

When the time for conversion to dual purpose arrives, no alteration is required on turbogenerator A, it continues to work as before with the only exception, that its exhaust steam is directed not to turbine B, but to the brine heaters of the desalination plant, whilst the condensing turbine B may be replaced by a back-pressure turbine with steam conditions similar to those of A.

Additional steam generating plant will have to be installed to feed the new back-pressure turbine B and be of a capacity to enable the electric alternator of B to give the same electric power as before.

The exahust steam of new turbine B will also go to the brine heaters of the desalination plant.

Alternatively, if the power plant consists of more than one group of turbogenerators A and B, an additional turbogenerator of type A of suitable size may be added, when conversion to dual purpose is required.

At periods, when the desalination plant or part of it is not in use, the operation of the original power generating plant may revert to the former arrangement of turbogenerators A and B in series on the turbine side.

Figure 3:
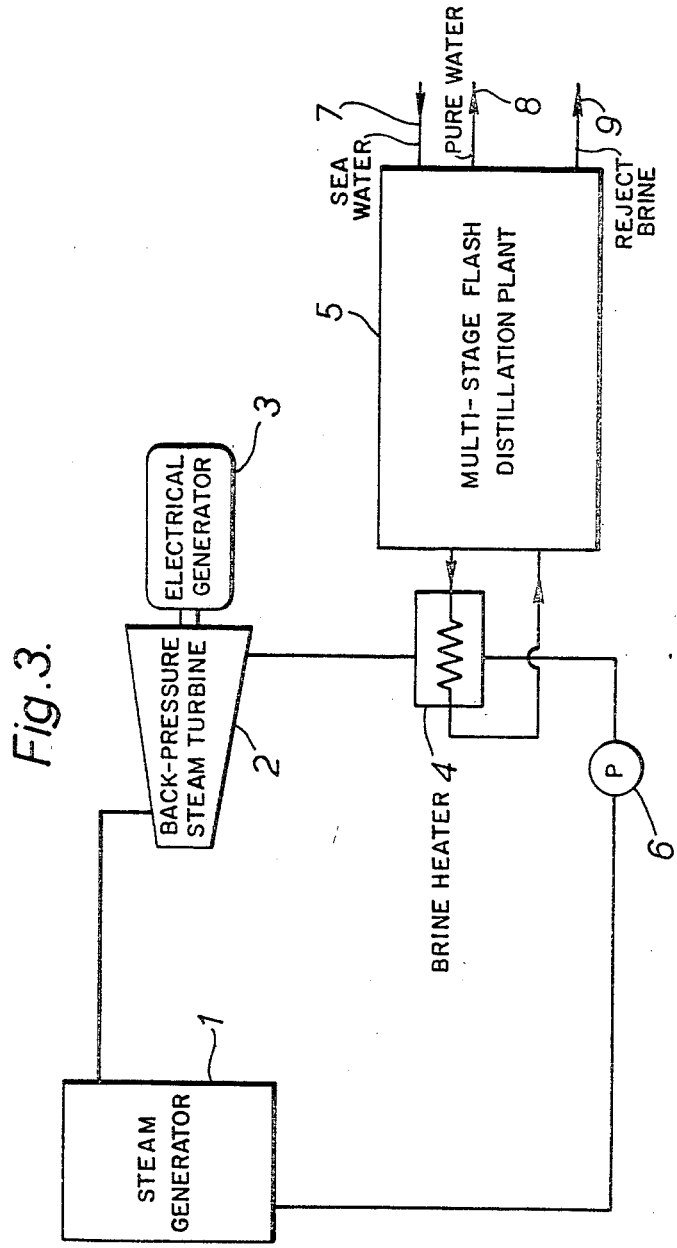
FIG. 3 is a diagrammatic representation of a combined desalination and power generating plant according to the invention.

There is now described, by way of illustration only, one embodiment of the invention, with reference to the accompanying drawings in which:

In FIGURE 3, a steam generator 1 provides high-temperature, high-pressure steam to a back-pressure steam turbine 2 driving an electricity generator 3. Low pressure exhaust steam of required temperature and pressure is passed to the brine heater 4 of a multi-stage flash distillation plant 5 and after condensation is returned via (condensate) pump 6 to the steam generator 1.

Sea water is introduced via inlet 7 into the multi-stage distillation plant 5 and purified water (distillate) emerges from outlet 8 while reject brine emerges from outlet 9.

I claim:

1. A method of operating a steam and power plant, comprising the steps of:
    generating steam in a first amount, utilizing said steam to drive at least one condensing-steam turbine, and causing said turbine to drive an electrical generator to produce a first power output;
    continuing operation of said plant as set forth until a substantial part of its capital costs have been recovered; then
    replacing said condensing-steam turbine with a back-pressure steam turbine;
    generating steam in an amount greater than said first amount, utilizing said greater amount of steam to drive said back-pressure steam turbine and causing said turbine to drive said electrical generator to produce a second power output substantially equal to said first output; and
    utilizing the exhaust low pressure steam from said back-pressure turbine for further heat utilizing purposes.

2. The method defined in claim 1 wherein said further heat utilizing purposes comprises operating a water desalination plant.

3. The method defined in claim 2 wherein said water desalination plant comprises a multistage flash-distillation plant.

4. A method of operating a steam and power plant, comprising the steps of:
    generating steam in a first amount and utilizing said steam to drive a back-pressure turbine with associated electrical generator;
    using the exhaust steam from said back-pressure turbine to drive a condensing steam turbine with second electrical generator;
    continuing operation of said plant as set forth until a substantial part of its capital costs have been recovered; then
    selectively directing exhaust steam from said back-pressure turbine to other heat utilizing purposes, or to said condensing-steam turbine.

References Cited

UNITED STATES PATENTS 971,183   9/1910   Faget _____ 60—5

(Other references on following page)

UNITED STATES PATENTS

| | | | |
|---|---|---|---|
| 1,644,754 | 10/1927 | Stein | 60—67 XR |
| 1,905,085 | 4/1933 | Gay | 60—67 XR |
| 2,048,566 | 7/1936 | Rosch | 60—67 XR |
| 2,893,926 | 7/1959 | Worthen et al. | 60—64 XR |
| 3,237,413 | 3/1966 | Taubert | 60—64 |
| 3,352,107 | 11/1967 | Blaskowski | 60—64 |
| 2,175,884 | 10/1939 | Doran | 60—70 |
| 2,254,424 | 9/1941 | Gleichmann | 60—70 |
| 3,412,558 | 11/1968 | Starmer | 60—67 |
| 3,416,318 | 12/1968 | Chocquet | 60—67 |

MARTIN P. SCHWADRON, Primary Examiner

ROBERT R. BUNEVICH, Assistant Examiner

U.S. Cl. X.R.

60—67, 95